(12) United States Patent
Stevens et al.

(10) Patent No.: US 8,966,116 B2
(45) Date of Patent: Feb. 24, 2015

(54) MANAGING STREAMED COMMUNICATION

(71) Applicant: British Telecommunications public limited company, London (GB)

(72) Inventors: Timothy Sean Stevens, Woodbridge (GB); Ian Christopher Kegel, Woodbridge (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 14/229,036

(22) Filed: Mar. 28, 2014

(65) Prior Publication Data

US 2014/0297811 A1    Oct. 2, 2014

(30) Foreign Application Priority Data

Mar. 28, 2013 (EP) .................................. 13250048

(51) Int. Cl.
*G06F 15/173* (2006.01)
*H04L 29/06* (2006.01)
*H04L 12/707* (2013.01)

(52) U.S. Cl.
CPC ............ *H04L 65/60* (2013.01); *H04L 65/4076* (2013.01); *H04L 45/22* (2013.01)
USPC ........................................................ 709/238

(58) Field of Classification Search
USPC ................................... 709/230–235, 238–240
See application file for complete search history.

(56) References Cited

U.S. PATENT DOCUMENTS

| 7,564,876 B2 | 7/2009 | Le Sauze et al. |
| 2008/0008089 A1 | 1/2008 | Bornstein et al. |

FOREIGN PATENT DOCUMENTS

EP    1 777 962    4/2007

OTHER PUBLICATIONS

EP Search Report for EP Application 13 250 048.9, dated Sep. 13, 2013.
T. Kusumoto. et al., "Strategies towards robust and stable application layer multicast", Packet Video 2007, (Nov. 1, 2007), pp. 253-262.
X. Jin. et al., "Serving dynamic groups in application-level multicast", High Performance Switching and Routing, 2005, (May 12, 2005), pp. 432-436.
J. Fan et al., "Dynamic Topology Configuration in Service Overlay Networks: A Study of Reconfiguration Policies", College of Computing, Georgia Institute of Technology, printed on Mar. 28, 2014, 12 pages.
I.M. Weinstein, "Multipoint Videoconferencing Goes Virtual", Wainhouse Research, (Jun. 2012), 12 pages.

*Primary Examiner* — Chirag R Patel
(74) *Attorney, Agent, or Firm* — Nixon & Vanderhye PC

(57) ABSTRACT

Methods, apparatus and systems are disclosed for managing streamed communication (such as video, audio, or audio-visual communication) between client devices and remote devices via a digital data communication network in situations where the data communication network comprises one or more routers operable to receive streamed data from one or more client devices and/or from one or more other routers, and to forward such streamed data to one or more remote devices and/or to one or more other routers such as to enable the client device and potentially-varying subsets of the one or more remote devices to participate in a communication session.

14 Claims, 8 Drawing Sheets

Example Topology and Components

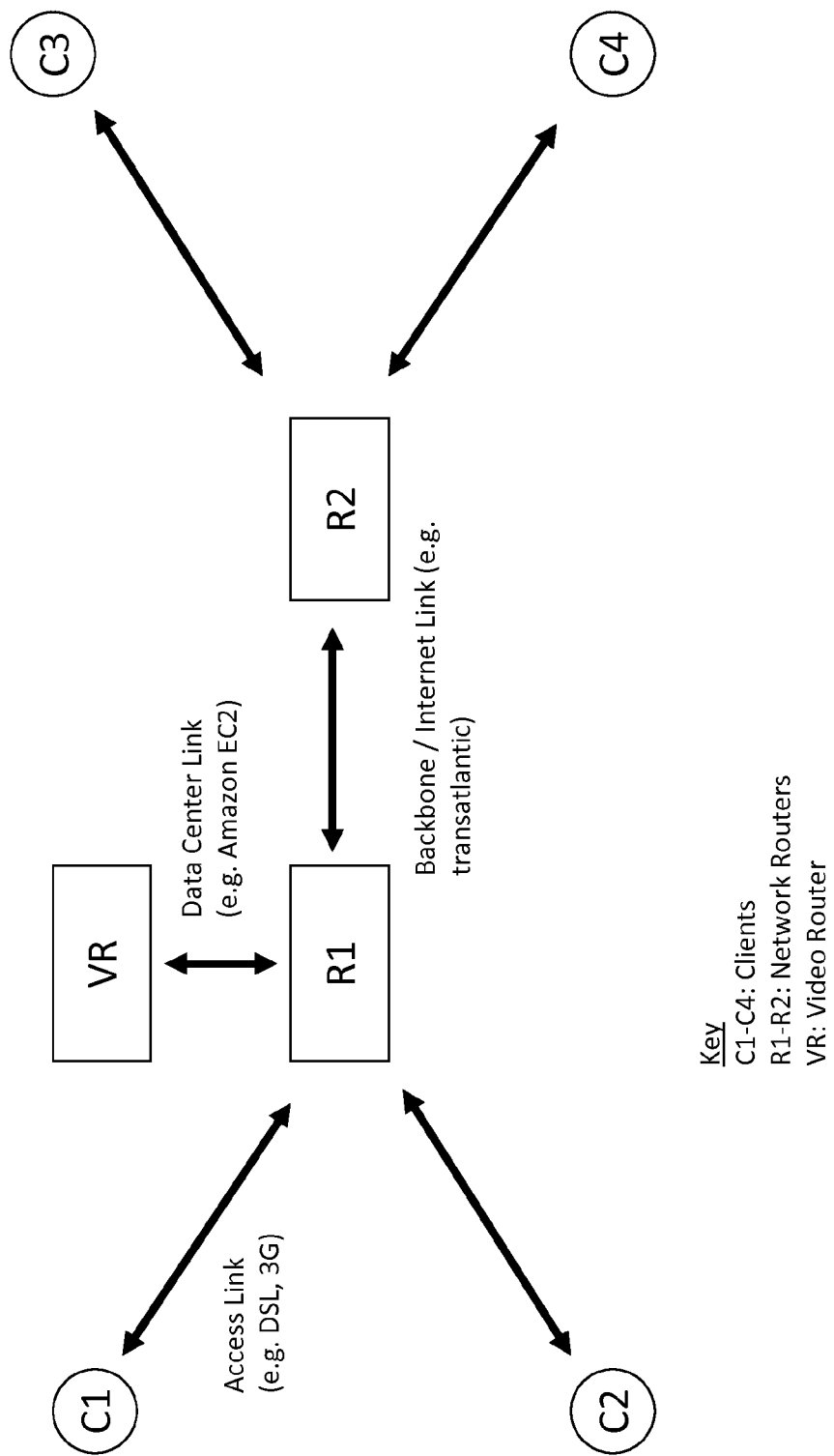
Figure 1 - Example Topology and Components

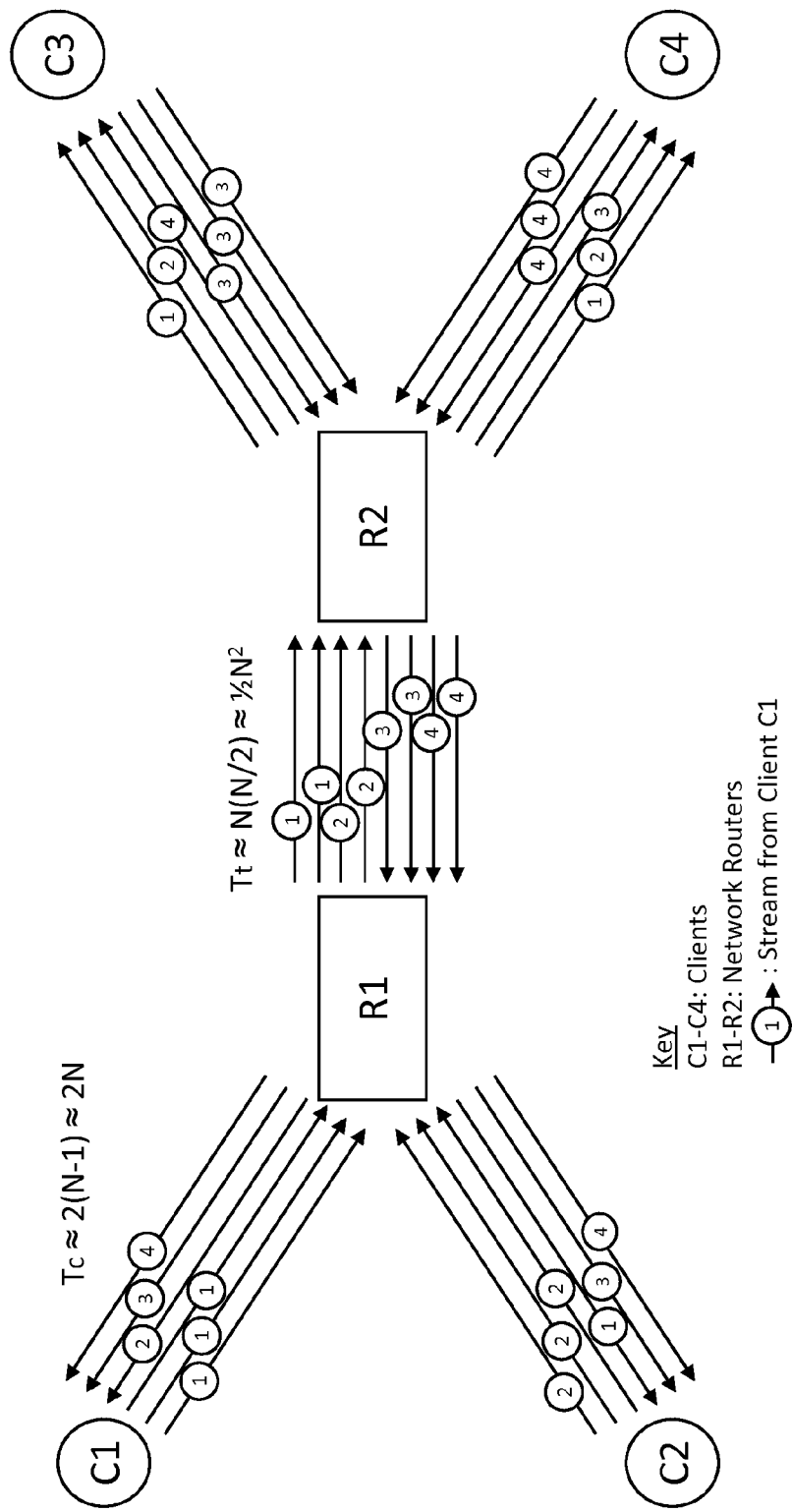
Figure 2 – Scenario Without Dedicated Video Router

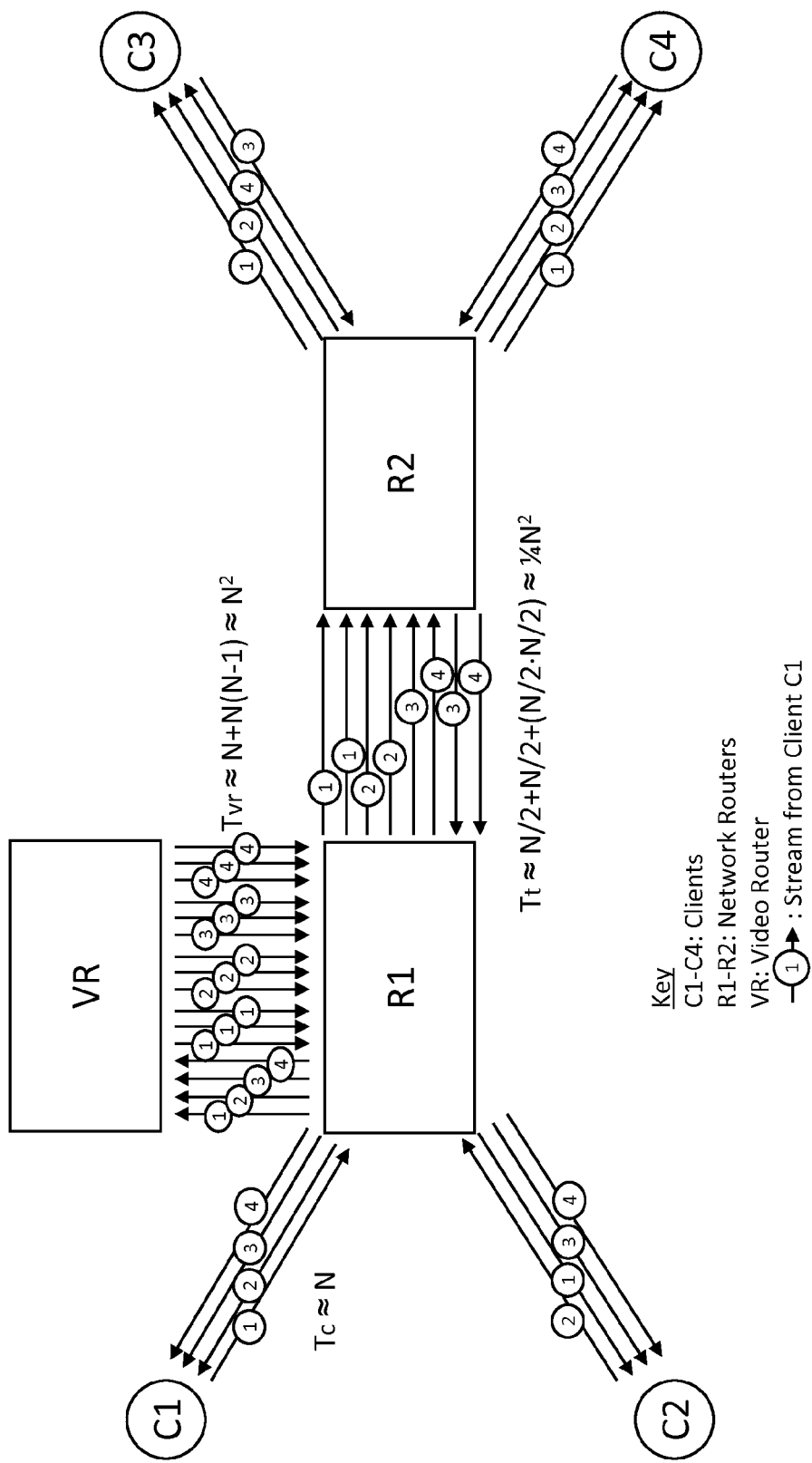
Figure 3 - Scenario With One Dedicated Video Router

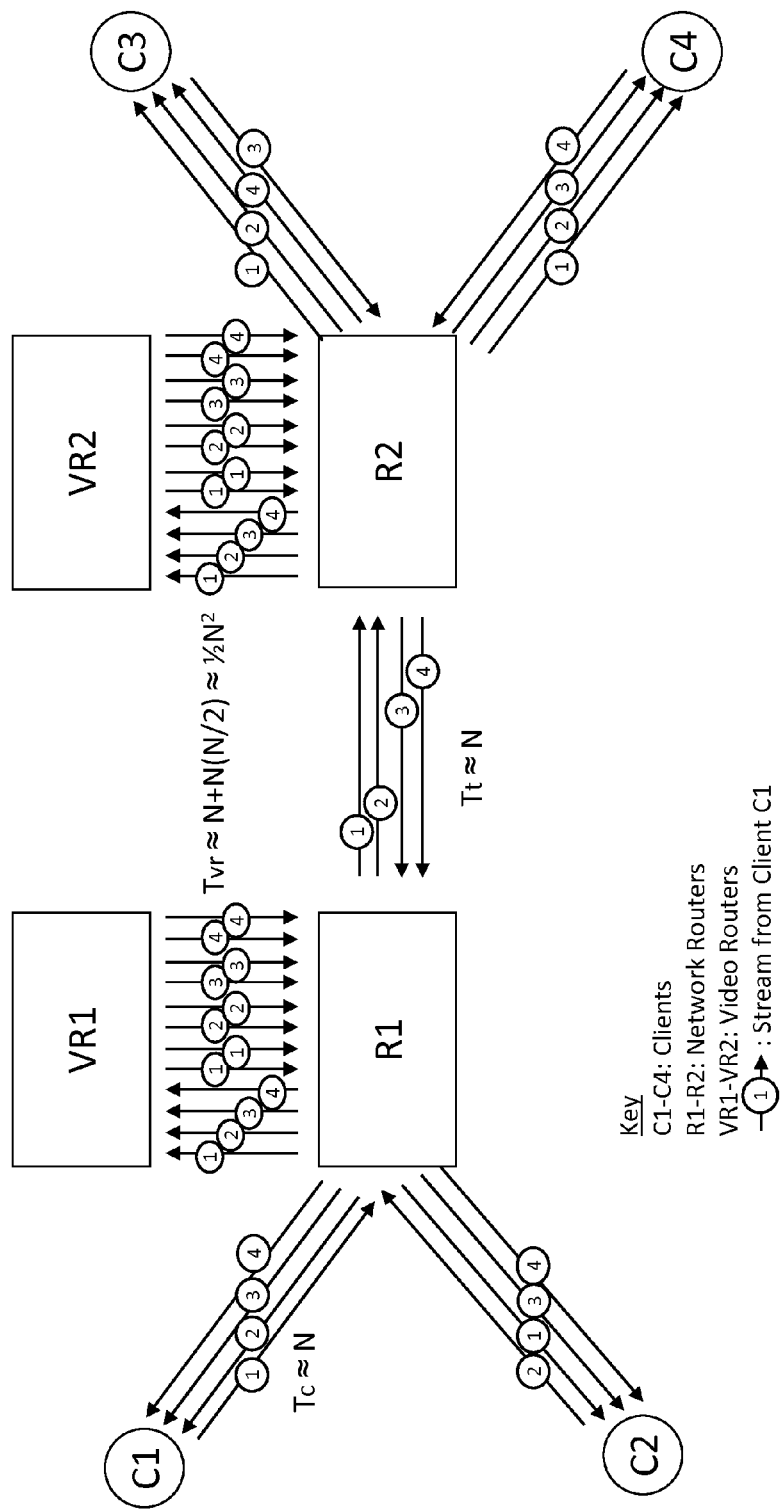
Figure 4 - Scenario With Two Cascaded Video Routers

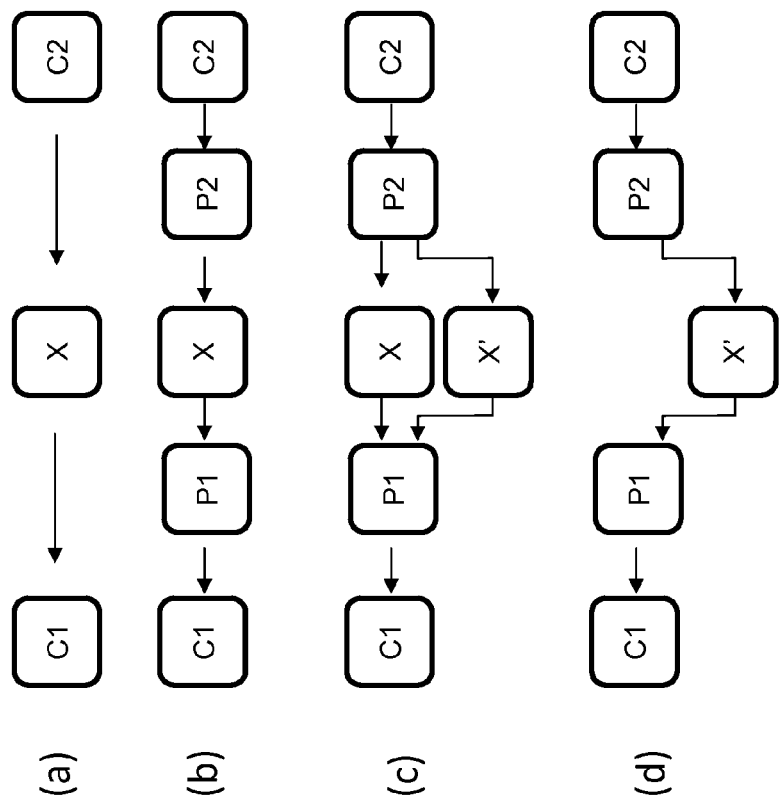
Figure 5 – Use of Proxies for Switching Streams

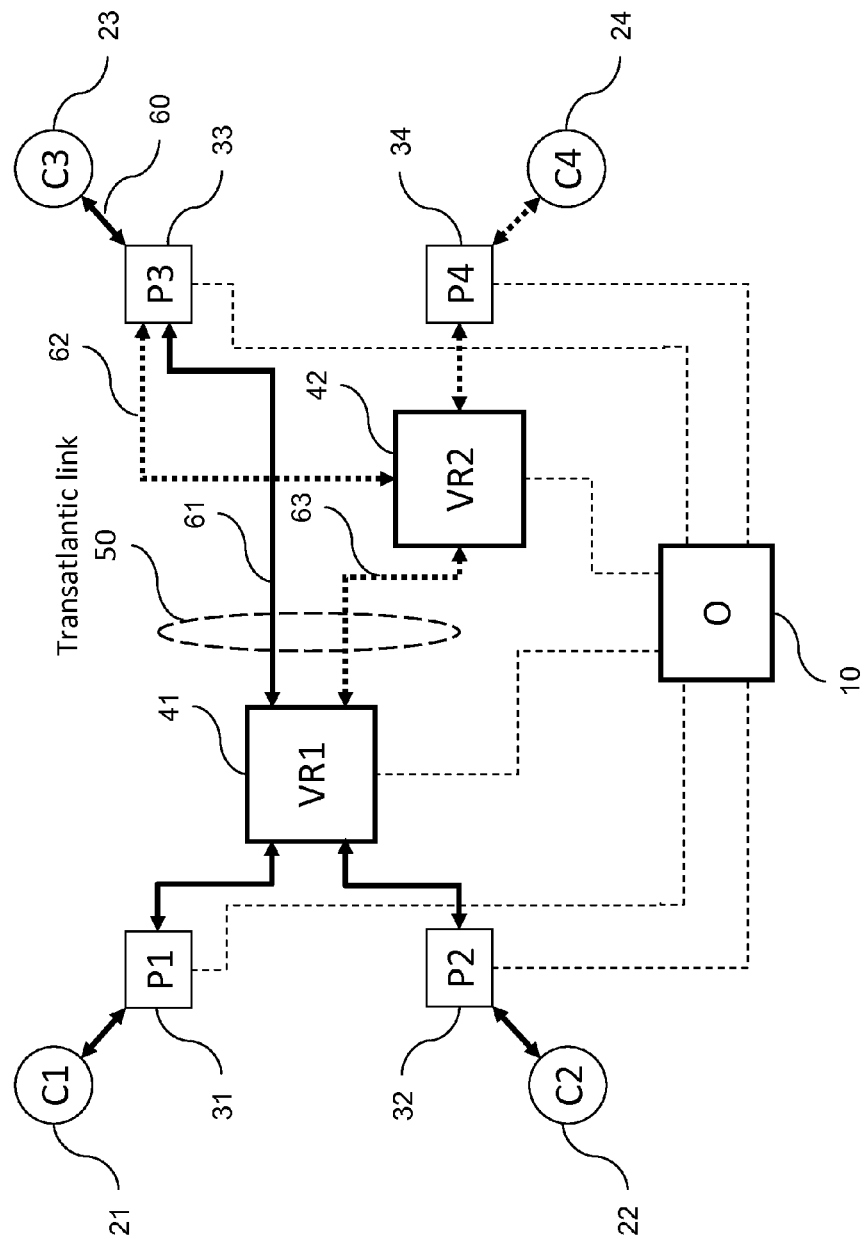
Figure 6 – Switching Streaming Topology Using Proxies

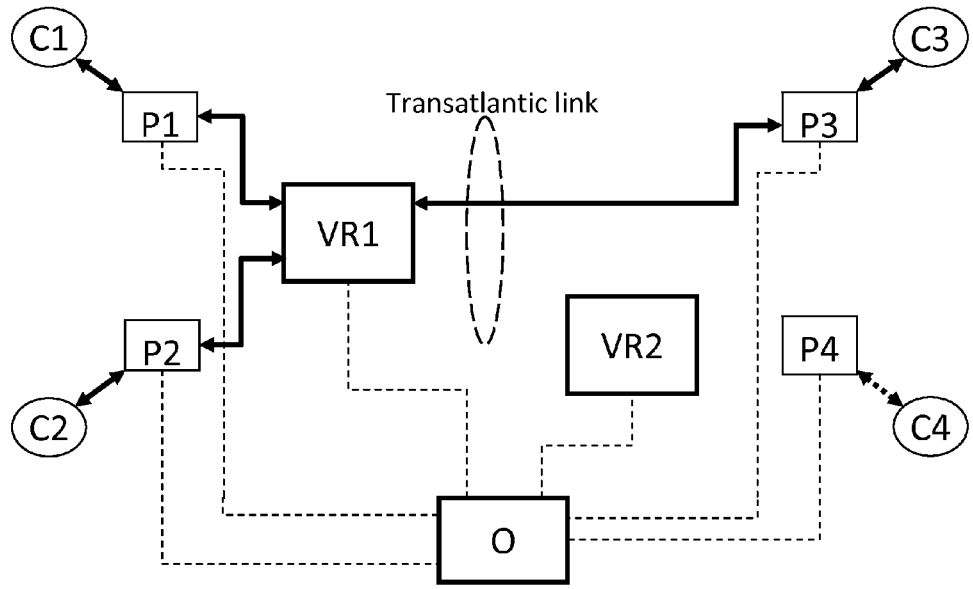
Figure 7(a) - Streaming Topology Before Switch
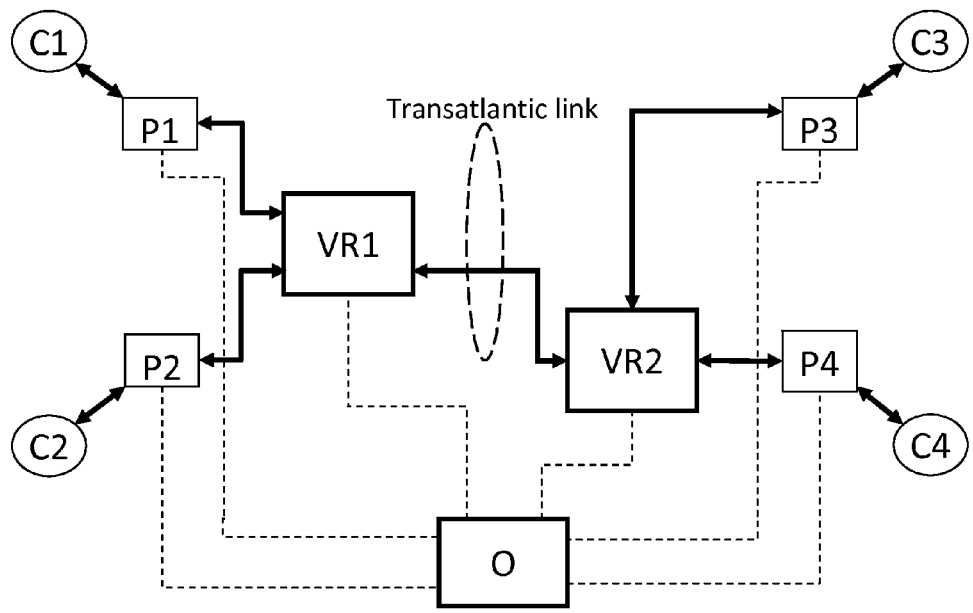
Figure 7(b) - Streaming Topology After Switch

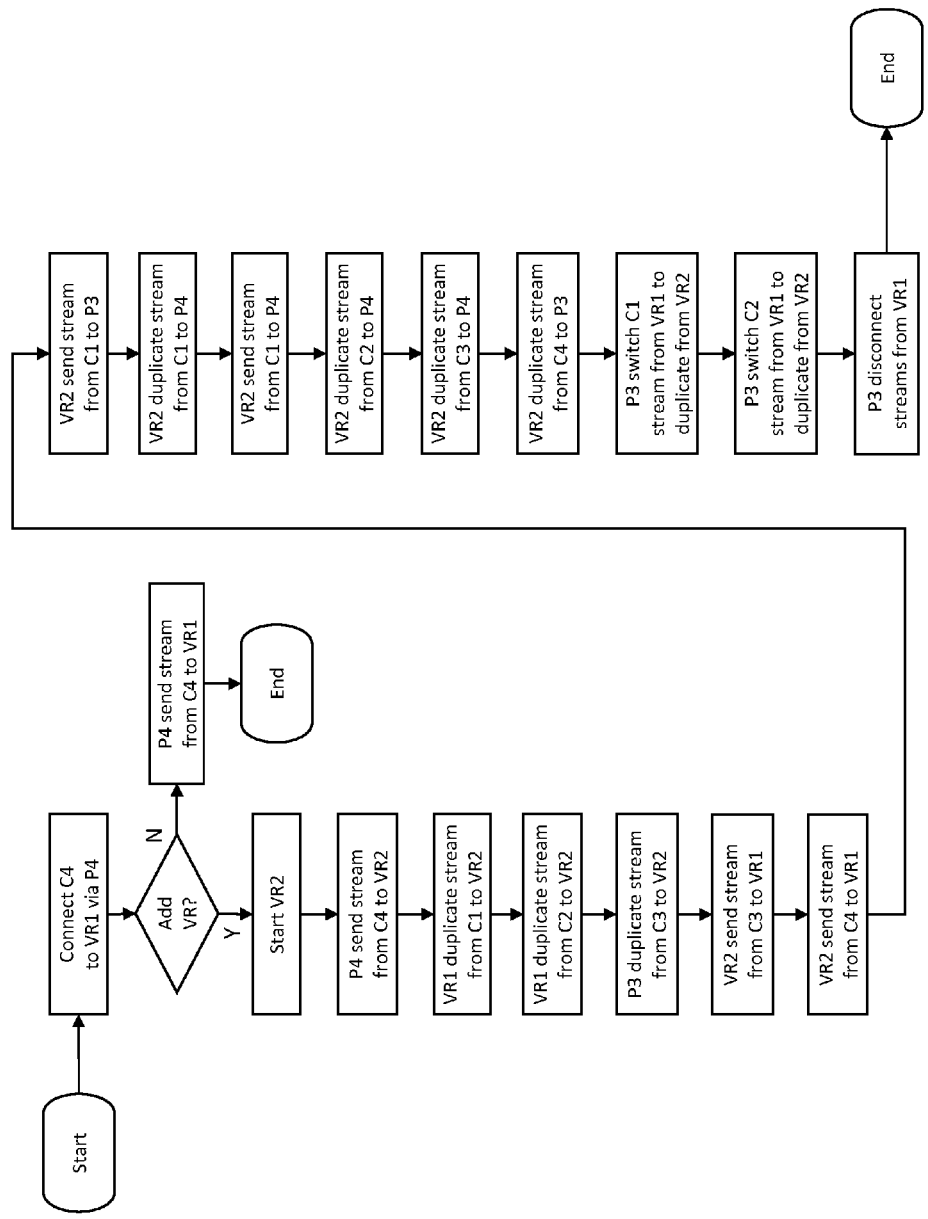
Figure 8 – Process for Switching Streaming Topology Using Proxies

MANAGING STREAMED COMMUNICATION

This application claims priority to EP Application No. 13250048.9 filed Mar. 28, 2013, the entire content of which is hereby incorporated by reference.

TECHNICAL FIELD

The present invention relates to managing streamed communication. Aspects and preferred embodiments of the present invention relate to methods, apparatus and systems for managing streamed communication (such as video, audio, or audio-visual communication) between client devices and remote devices via a digital data communication network, in particular in situations where the data communication network comprises one or more routers operable to receive streamed data from one or more client devices and/or from one or more other routers, and to forward such streamed data to one or more remote devices and/or to one or more other routers such as to enable the client device and potentially-varying subsets of the one or more remote devices to participate in a communication session.

BACKGROUND TO THE INVENTION AND PRIOR ART

Internet Protocol (IP) networks are required to route several types of content, with differing requirements of reliability, speed, latency, scaling and bandwidth utilisation. Increasingly, such networks are being used to deliver video content, both point-to-point and also point-to-multipoint (analogous to broadcast television, where there may be large numbers of clients consuming the same television programme). In the latter case, an important goal in many situations is to reduce the number of simultaneous streams that need to be transmitted: for example, a strategy whereby a sender transmits a discrete stream of content for every client (unicast) is very inefficient in terms of network utilisation and computational resources. Additionally, in this approach, the sender needs to maintain knowledge of all the clients which are consuming the content at any time, since a unique IP stream must be generated for each client.

Several solutions have been proposed or adopted to address these issues. Streaming proxies can help in the unicast case, in that they can accept an input stream, and replicate it to multiple clients, thus removing the need for the content server to maintain a record of active clients, and also allowing the streaming proxy to be located topologically closer to the clients (i.e. closer in terms of network nodes and links), and possibly "better" located to them in terms of factors such as the cost of using the necessary links, or in terms of the likely network performance thereon (e.g. round-trip time (RTT) or delay, jitter, reliability, etc.). In situations requiring higher numbers of clients, various forms of Content Delivery Networks (CDNs) and/or multicast (IP-layer, or higher-level) are used (BBC "iPlayer", etc.). A typical CDN is a system that can serve content from multiple servers at various locations, in order to spread the system load, and to dynamically adjust various parameters such as routing in response to changing demand and possible other network issues.

These approaches cater well for content that changes relatively slowly (i.e. content is generally added and deleted perhaps a few times a day), and for situations where clients join and leave at any time. They generally assume a network topology that is either fixed or varying slowly. Techniques based on Application-Layer Multicast (ALM) allow extra intelligence to be added in order to manage the stream distribution better—this becomes more important in cases where both the sources and clients may join and/or leave frequently.

In cases where two (or more) parties are taking part in a video-enabled chat, the networking requirements change, in that there is no longer necessarily a 'producer' and 'consumer(s)' of the video; all parties may essentially be peers. This situation places additional demands on the network topology when large numbers of separate n-way video sessions are required, as may be the case in relation to a multi-party video-enabled discussion forum, for example.

Many existing techniques (such as video-conferencing technologies, for example) assume that a network topology is generated and/or dimensioned before or at the start of a call or session, and that this will fundamentally not change throughout the call. Changes are generally limited to adding or removing streams as clients join or leave. Other changes may be for example to switch from multicast to unicast (perhaps with some local caching) if a client needs to pause the feed, for example.

Additionally, traditional networks have generally been designed with resilience and reliability as fundamental requirements. These have generally been addressed by adding link redundancy, which generally works well for IP-based protocols. However, real-time video communication with relatively high bandwidth streams places demands on network performance which can currently add significant cost if a consistently high quality of experience (QoE) is required.

PRIOR ART TECHNIQUES

A paper entitled "Dynamic Topology Configuration in Service Overlay Networks: A Study of Reconfiguration Policies" by Jinliang Fan and Mostafa Amar (available online at http://www.cc.gatech.edu/~ammar/papers/infocom06-JLfan.pdf) discusses cost-optimisation and dynamic reconfiguration for overlay networks (not native ones). It also references techniques such as Application-Level Multicast (ALM). It describes a method for dynamically determining the optimal topology of an overlay network, and acknowledges the potential disruption to customer experience as a cost of dynamic changes. It will be noted that it does not propose solutions for avoiding that disruption for any service scenario.

A paper entitled "Serving Dynamic Groups in Application-Level Multicast" by Xing Jin, Wan-Ching Wong and S.-H. Gary Chan (available online at www.cse.ust.hk/~gchan/papers/HPSR05_SALM.pdf) introduces the concept of subset Application-Level Multicast for data broadcasting. The use-cases discussed (which relate to share prices and news stories) are predicated on a "publish-and-consume" model, and the paper describes how mesh network can be built to efficiently distribute such content. It explores the efficacy of three algorithms used for determining the network efficiency by determining the relative delay penalty and link stress in networks consisting of up to 1024 nodes. It addresses the determination and development of efficient distribution of content, but it will be noted that it does not address scenarios in which the network topology would change mid-session and in which avoiding disruption due to network configurations is either likely or critical to the user's experience of the service.

US Patent Application US20081000808, entitled "Optimal route selection in a content delivery network", relates to overlay networks and their configuration, and relates to approaches to find the optimum node configuration. While this addresses the challenge of efficient content distribution in CDN, it will be noted that it does not propose any mechanisms for supporting a session during network reconfiguration, nor does it consider a network in which all the end nodes are essentially peers, both transmitting and receiving content. Further it determinedly addresses an overlay transmission network in the form of a CDN.

U.S. Pat. No. 7,564,876, entitled "Method of resynchronizing streams benefiting from circuit emulation services", relates to jitter management. This is limited to resynchronising streams, not for network optimisation.

A paper entitled "Multipoint Videoconferencing Goes Virtual" (available online at http://www.wainhouse.com/files/papers/wr-mp-vc-goes-virtual.pdf) describes methods of distributing video traffic in a video calling system. This discusses how the use of scalable video coding techniques (H.264 SVC) can be used to provide cost advantages by allowing switching in Multipoint Control Units (MCUs) to take place without the need to transcode the media stream, and how this can offer benefits in relation to transmit time and CPU requirements. It will be noted that it does not relate to how the user experience of a video call could be maintained while a network undergoes topology changes in response to changes in the patterns of communication in the group video call, however.

SUMMARY OF THE INVENTION

According to a first aspect of the present invention, there is provided a method of managing streamed communication between a client device and one or more of a plurality of remote devices via a digital data communication network, the data communication network comprising a plurality of routers each operable to receive streamed data from one or more of said devices and/or from one or more other routers, and to forward said streamed data to one or more of said devices and/or to one or more other routers, the method comprising, at a proxy module associated with the client device:

intercepting streamed data intended to be streamed between the client device and one or more of said remote devices via one of the routers of the digital data communication network, and streaming said data in one or more first router-side streams between the proxy module and a first one of said routers, and in one or more client-side streams between the proxy module and the client device;

receiving an indication that data intended to be streamed between the client device and the one or more remote devices should be streamed via a different one of the routers, and in response thereto, establishing one or more second router-side streams between the proxy module and a second one of said routers;

and after the establishment of the one or more second router-side streams:

intercepting streamed data intended to be streamed between the client device and one or more of said remote devices via one of the routers, and streaming said data between the proxy module and the second router in the one or more second router-side streams while continuing to stream the data between the proxy module and the client device in the one or more client-side streams; and terminating the one or more first router-side streams.

According to preferred embodiments, the streamed data may comprise streamed video, audio or audio-visual data. Embodiments of the invention may be applicable in relation to streamed data of other types, however.

Techniques to which preferred embodiments of the invention relate may be applicable particularly in relation to scenarios where the streamed data comprises data being streamed using an "unreliable" or "non-guaranteed" delivery protocol such as the User Datagram Protocol (UDP), which does not rely on the provision of notifications from receivers to senders as to the delivery of transmitted data. Embodiments of the invention may also be applicable in relation to scenarios where the streamed data comprises data being streamed using a "reliable" or "guaranteed" delivery protocol such as the Transmission Control Protocol (TCP), however.

According to preferred embodiments, the step of receiving an indication that data intended to be streamed between the client device and the one or more remote devices should be streamed via a different one of the routers may comprise receiving an instruction from a predetermined control entity. It should be noted however that the "indication" received need not be in the form of an instruction, and there need not be a predetermined control entity. In alternative embodiments, the "indication" may be in the form of information about the entities involved in a communication session and/or about the links between them and/or about the network in general, or about changes to any of these. The proxy module may instead receive such information, and itself determine therefrom that data intended to be streamed between the client device and the one or more remote devices should be streamed via a different one of the routers. Such a determination may be made individually by the proxy module, or collaboratively with other entities, perhaps corresponding entities acting as proxy modules in respect of other client devices involved in the communication session. Other types of "topology-change" indication may also be used in relation to particular embodiments and scenarios.

According to preferred embodiments, the method may include a switching operation performed after the establishment of the one or more second router-side streams and before the termination of the one or more first router-side streams, the switching operation comprising switching from a pre-switch mode in which the one or more first router-side streams are coupled with the one or more client-side streams whereby to provide streamed data between the client device and the one or more remote devices to a post-switch mode in which the one or more second router-side streams are coupled with the one or more client-side streams whereby to provide streamed data between the client device and the one or more remote devices. Preferably the "switch-over" is performed instantaneously, i.e. such that there is no (discernible) gap between the pre-switch mode and the post-switch mode.

Such a switching operation may be performed at a time dependent on the content of the data being streamed in the first and/or second router-side streams. If, for example, the streaming is being performed in accordance with a coding scheme such as MPEG-4 (H.264), which uses Intra Frames (I-Frames), the switching operation may be triggered, for example, by the arrival of an I-Frame in the first and/or second router-side stream(s). The arrival of corresponding I-Frames in corresponding first and second router-side streams may allow the two router-side streams themselves to be synchronised or matched to each other, possibly by appropriate buffering in the proxy device or in the client device, before, during, or after the switch, in order to ensure that the switch from coupling the "old" router-side stream(s) with the client-side stream(s) to coupling the "new" router-side stream(s) with the client-side stream(s) may be as seamless as possible from the point of view of the user in question. Other aspects of the content of the data being streamed, such as packet sequence numbers, may be used as well as or instead of the presence of I-Frames.

According to a second aspect of the present invention, there is provided a proxy module for managing streamed communication between a client device and one or more of a plurality of remote devices via a digital data communication network, the data communication network comprising a plurality of routers each operable to receive streamed data from one or more of said devices and/or from one or more other routers, and to forward said streamed data to one or more of said devices and/or to one or more other routers, the proxy module being associated with the client device and being operable to perform a method according to the first aspect.

It should be noted that a proxy module is said to be "associated" with a particular client device in the sense that the two are functionally associated. This should not be taken to mean that the proxy module must be inside or outside the client device with which it is associated, nor that it must even be within the same premises or home network as that client device. It may however be a functional module within a client device such as a home computer, or may be incorporated into a home hub, a home gateway, or another such routing and/or gateway device, for example.

The various options and preferred embodiments referred to above in relation to the first aspect are also applicable in relation to the second aspect.

According to a third aspect of the present invention, there is provided a system for managing streamed communication between a plurality of client devices via a digital data communication network, the data communication network comprising a plurality of routers each operable to receive streamed data from one or more of said client devices and/or from one or more other routers, and to forward said streamed data to one or more other client devices and/or to one or more other routers, the system comprising:

a plurality of proxy modules, each proxy module being associated with one or more of said client devices and being operable to perform a method according to the first aspect; and a control module operable to determine whether data intended to be streamed between one client device and another client device should be streamed via a different one of the routers, and if so, to issue a routing-change indication in respect of such a determination.

The various options and preferred embodiments referred to above in relation to the first and second aspects are also applicable in relation to the third aspect.

According to preferred embodiments, the control module may be operable to monitor the client devices and/or their respective proxy modules and to determine from said monitoring whether data intended to be streamed between one client device and another client device should be streamed via a different one of the routers, and if so, to issue a routing-change indication in respect of such a determination.

According to preferred embodiments, the control module may be operable to issue routing-change indications whereby to schedule routing changes in respect of data streams from different client devices to be effected at different times.

In relation to the above, it will be understood that with each routing change, there will generally be a short period during which corresponding "pre-switch" and "post-switch" streams from and to the same client devices will simultaneously be traversing the network. While this is intentional, as the overlap allows for the desired "seamless" switching to be performed, this may lead to high peaks in throughput if a large number of streams are "doubled-up" at the same time. By staggering the precise times at which routing changes in respect of data streams from different client devices are effected, such peaks in throughput can be lowered.

According to preferred embodiments, the control module may be operable to monitor delays experienced by data streamed to and from respective client devices, to identify discrepancies between the respective delays, and to provide information to the client devices and/or to their respective proxy modules enabling action to be taken to decrease or remove said discrepancies. In such scenarios, the information provided to the client devices and/or to their respective proxy modules may be such as to enable changes to buffer configurations of said client devices and/or of their respective proxy modules to be made whereby to decrease or remove such discrepancies.

According to preferred embodiments, the system may further comprise one or more multi-stream routers, each multi-stream router being operable to receive one or more streams of data and to receive in respect of each received stream an associated multi-stream indication, said multi-stream indications each indicating one or more entities towards which duplicates of the associated stream should be forwarded, each multi-stream router being operable to route a duplicate of the associated stream towards each of the entities indicated by said multi-stream indication. In such scenarios, the multi-stream indications may indicate one or more client devices and/or one or more other routers towards which duplicates of an associated stream should be forwarded. The control module or another entity may be operable to provide such multi-stream indications to the one or more multi-stream routers as applicable.

Techniques to be described below relate to ways in which data networks can be used to provide real-time audio-visual and other types of streamed communication. Such techniques may be used to allow for a network topology to be changed dynamically, in response to changing conditions and/or changes in the number, identities and/or locations of the participating clients, for example, without (noticeably) interrupting the flow of communication signalling and data between those clients. This differs from the traditional situations such as standard video-conferencing, where client or server nodes may simply be added or removed, and where the network routing is not changed or intended to be changed during the duration of the communication session. The ability to modify the topology in real time, without disrupting the end user's experience, offers advantages because it provides an opportunity to optimise the way the network is used in terms of cost or other factors which may be important to the network operator, to a controlling party, and/or to the participating clients.

By way of an example, consider a video chat-room service in which participants from anywhere in the world can join a multi-party video-call at any time of day. Such a service may be analogous to text-based chat-rooms, which are already commonplace, but the use of video means that each chat-room client must have the ability to transmit a live stream from their own camera, while at the same time receiving multiple live streams from other chat-room participants. The chat-room may be configured to display a low-resolution version of every participant's stream for each participant in a 'mosaic'-style presentation, or may perhaps select a subset of streams based on participants' activity and/or preferences. Either way, the nature of the chat-room will mean that participants are likely to join and leave in an ad hoc manner, with each join or leave event resulting in a change to the network topology of the whole system. Furthermore, it could be expected that most participants will be active during the daytime (or perhaps evening) hours in their respective time-zones, and therefore that on a global scale, the participant population will 'migrate' across different global locations as time progresses through each 24-hour period. This scenario illustrates a key challenge addressed by techniques to be described because such a video chat-room should be capable of providing a continuous customer experience 24 hours per day, but it would be advantageous for an operator of such a chat-room to be able to adjust the network topology in order to minimise the cost of carrying chat-room traffic between participants, and to manage the transmission of the live streams in a more efficient way.

The prior disclosures referred to above cannot easily be applied to the scenario of such ad hoc video communication where the optimal network configuration may change significantly during a session (in which it may be important that communication between users is not disrupted). For example, in the case where each endpoint has at least one video camera, the management of bandwidth (and other 'cost' measures, such as end-to-end latency, video encoding/decoding processing requirements etc.) may become challenging, particularly in the case of asymmetric networks, where the upstream bandwidth is generally small compared to the downstream bandwidth.

Techniques to be described below thus relate in particular to the problem of how to avoid the experience of participants in a communication session such as a video communication session from being disturbed when a network is reconfigured during a communication session. They relate particularly to (but not only to) scenarios such as wide-scale video "chat" or conferencing services in which communication takes place within groups that may emerge and decline in a more or less ad hoc fashion.

In such scenarios, a controlling entity, the participants or a network operator may be able to determine the best network topology to deliver the required experience for the participants, and react or provide instructions such that the network is able to be reconfigure to adopt such a topology. The manner in which such determinations are made and the factors on which such determinations may be based will be discussed briefly, but it will be understood that the technique is concerned primarily with the manner in which the entities involved implement any resulting topology change and/or react to instructions in relation to this.

In such scenarios, the network may, from time to time, change its configuration, including for example the location of key functionality (such as Multipoint Control Units, MCUs). Normally, using prior techniques, any such changes would significantly disturb any current session as the session would have been set up between specific nodes, and if these nodes are changed (which they will be due to any such topology change), the user session would either terminate or be significantly interrupted as the traffic routing models are recalculated.

Preferred embodiments involve use of a proxy module, to which the core user application sends its media stream and signalling. The proxy module forwards the media stream and signalling into the network, and is able to do so to more than one node, each of which may be a normal router, a dedicated video router, or another such node. If it is decided to change the network topology and that change requires a user to send its media stream and signalling to a different node, the system prepares for this change by establishing one or more additional media streams and signalling paths to the node as are required in the new topology.

Once any required new streams are established, the system can switch from the original topology to the new topology (closing the original media and signalling stream(s) if required). The switching preferably occurs quickly (a small fraction of a second, for example) and thus does not disturb the experience of the user concerned significantly, if at all. This is because the users application has at all times been sending its media and any signalling to a fixed address—that of the proxy module—and there will (effectively) have been an uninterrupted path for the media and signalling into the network at all times.

Such preferred embodiments may thus enable improved or best possible user experience to be maintained in video and other such communication sessions by allowing the network to be changed during a specific session without significantly affecting an end user's experience.

Key benefits of such embodiments may be of use both to network operators and to users of the communication system. An operator may benefit from efficiencies relating to capacity: depending on implementation decisions, they could require less redundancy (number of nodes or links) since they would be able to reconfigure routings more dynamically.

Users may benefit from a more consistent video (or other such) experience: delays could be more controllable (particularly in the cases where the communication session spans inter-continental routes where propagation delays may be significant) by dynamically relocating key components to place them closer to the optimum endpoints. Importantly, this means that a communication signal between two ad hoc endpoints which happen to be in the same country need not be sent to a different continent and back again, which could incur a significant round-trip delay.

Additionally, the presence of dynamically-movable components could enable additional services to be provided, such as allowing multi-party video calls to split off from larger calls, or conversely for larger calls to be aggregated from smaller groups.

An important factor in relation to the above is that the users' experiences need not be adversely or appreciably affected by any such dynamic reconfiguration.

BRIEF DESCRIPTION OF THE DRAWINGS

A preferred embodiment of the present invention will now be described with reference to the appended drawings, in which:

FIG. 1 shows an example topology for a video communication session between four clients, and the components involved therein, including one video router;

FIG. 2 shows the data streams involved in a communication session between four clients in a scenario without a video router;

FIG. 3 shows the data streams involved in a communication session between four clients in a scenario with one video router;

FIG. 4 is shows the data streams involved in a communication session between four clients in a scenario with two video routers;

FIG. 5 illustrates the concept of using proxies for switching between data streams;

FIG. 6 illustrates how streaming topology may be changed during a communication session between four clients, using a method according to a preferred embodiment;

FIG. 7(a) shows the streaming topology in respect of the scenario illustrated in FIG. 6 before the topology change;

FIG. 7(b) shows the streaming topology in respect of the scenario illustrated in FIG. 6 after the topology change; and FIG. 8 shows possible steps that may be carried out in order to implement a method according to a preferred embodiment.

DESCRIPTION OF PREFERRED
EMBODIMENTS OF THE INVENTION

With reference to the accompanying figures, a method and associated apparatus for performing a communication management technique according to a preferred embodiment of the invention will be described.

The present embodiment relates to video (which may be audio-visual) communication, although it will be understood that embodiments of the invention may be applicable in relation to pure audio or other types of streamed communication. The present embodiment allows dynamic changes in network topology to be effected through the use of one or more dedicated "multi-stream" routers which will be referred to as Video Routers (VRs) in the case of video (or audio-visual) communication. Such dedicated routers will generally be present in addition to one or more "normal" network routers which may serve their normal function of forwarding data across a network towards an intended destination. A video router in this context is a network component that is capable of switching real-time video streams between one or more source inputs and one or more destination outputs. Additionally, a video router can replicate streams to multiple outputs (1:n). Video routers may be cascaded such that the output from one may feed an input to another. In the system to be described, one or more video routers are used to interconnect video streams between different client endpoints.

For example, in the case where there are endpoints that span an expensive or high-delay transatlantic link, then it may make sense to minimise the 'expensive' link traffic, and in a situation where the distribution of clients and servers on either side of this link changes during the session, it may make sense to relocate the video router or equivalent components.

FIG. 1 shows a simplified example of a topology in which two pairs of clients (C1 and C2, C3 and C4) are separated by a transatlantic link, with a video router VR located at one end of this link.

FIG. 2 illustrates the data flows which would normally be required to fully interconnect video streams between four clients C1, C2, C3 and C4 in the absence of any video routers. All of the clients are connected via a communications network which includes two normal routers R1 and R2, which are connected to each other (possibly directly, or possibly via one or more other routers), forming what may be thought of as the "back-bone" of the network. Two of the clients (C1 and C2) are connected (directly) to the back-bone of the network via router R1, and the other two (C3 and C4) are connected (directly) to the back-bone of the network via router R2.

In respect of each client device (C1, for example), there will be one outward stream for data being streamed towards each of the other client devices, and one inward stream for data being streamed from each of the other client devices. Thus, where there are N participants in total, the total number of data streams $T_c$ required to be carried on the link between one of those participating clients and its "local" or "first-hop" router will be 2(N−1), which (for a large number of participants) will be approximately 2N.

In FIG. 2 (and FIGS. 3 and 4 referred to later), as indicated by the "Key", an arrow with a number in a circle thereon symbolises a data stream from the client having that number.

It will be noted that with the topology shown in FIG. 2, the streams between C1 and C2 and the streams between C3 and C4 do not need to pass between routers R1 and R2. Only the streams between C1 or C2 and C3 or C4 need to pass between routers R1 and R2. It will therefore be evident that where there are N participants in total, the total number of data streams $T_t$ required to be carried on the link between routers R1 and R2 will be approximately $\frac{1}{2}N^2$.

If the link between the two routers is an 'expensive' link (such as a transatlantic link), the amount of data carried on it is of importance, and in the present scenario, the bandwidth required for each stream will be similar, so it becomes of importance to reduce the number of streams on the 'expensive' link.

FIG. 3 illustrates the data flows which would be required to fully interconnect video streams between all clients C1, C2, C3 and C4 when using a single video router VR.

The video router VR is able to receive one stream from each participating client and provide, as its output, one stream containing the content from each client for each other client. This generally reduces the number of data streams $T_c$ required to be carried on the link between one of those participants and its "local" or "first-hop" router to N, made up of one outgoing stream and N−1 incoming streams (clearly for large numbers of participants, and to some extent at least where the number is four or more). The number of streams required to be carried on the link between the router R1 and the video router VR, and on the (potentially 'expensive') link between the two normal routers R1 and R2 may increase quickly with the number of participants, however.

It can be seen from FIG. 3 that, as the number of clients at each end increases, the total number $T_t$ of streams required on the back-bone or transatlantic link increases by the order of $N^2$, where N is proportional to the number of clients connected (in this case, four). If each stream on the transatlantic link required approximately the same bandwidth, this would mean that the bandwidth required would therefor also increase approximately by the order of $N^2$.

FIG. 4 shows a change in topology from FIG. 3. Here, as well as video router VR1 linked to (and on the same side of the transatlantic link as) router R1, an additional video router VR2 is included, linked to router R2 at the other end of the transatlantic link. In this configuration, the total number $T_t$ of streams required on the transatlantic link (and hence the bandwidth required) over the 'expensive' link is now only proportional to N, rather than $N^2$.

If, for example the number of participants N is 10, and if the data-rate required on each transatlantic stream is 1 Mbps, the total data-rate required on the transatlantic link could be reduced from 25 Mbps to 4 Mbps by the introduction of the second video router. And if the number of participants N is 30 (and if the data-rate required on each transatlantic stream is still 1 Mbps), the total data-rate required on the transatlantic link could be reduced from 225 Mbps to 4 Mbps by the introduction of the second video router.

It will also be noted that while the bit-rates from the Internet/Backbone to each video router may remain approximately the same in total, they may be distributed over two video routers, which allows for better scalability.

This approach of reducing core network bandwidth is often described as Application-Level Multicast (ALM), and in traditional systems a change of topology such as that described above (i.e. between the FIG. 3 topology and the FIG. 4 topology) would require connections between clients and video routers to be disconnected and reconnected, thus interrupting the customer experience for a real-time communication session.

FIG. 5 illustrates how the present embodiment may solve this problem in the simplest case. In FIG. 5(a), two clients C1 and C2 are separated from each other by (but may communicate with each other via) a network X. Adding proxy devices, each of which may be a simplified video router, in two places P1 and P2 (as shown in FIG. 5(b)) does not or need not appreciably or noticeably change the experience of C1 receiving a video stream from C2 or vice versa, assuming the delays introduced by the proxies are negligible. The proxies P1 and P2 may pass the video streams through without processing them in any way (e.g. transcoding). The proxies may also be arranged to pass through any signalling and configuration information which is associated with the video streams. This may include, but is not limited to Real Time Streaming Protocol (RTSP) messages to establish and control media sessions, and RTP Control Protocol (RTCP) messages to provide out-of-band quality of service (QoS) statistics and control information. If a streaming protocol other than the Real-Time Transport Protocol (RTP) is used, then signalling and configuration information may be transmitted in other formats.

The proxies P1 and P2 essentially isolate their respective clients C1 and C2 from the network X, which may be arbitrarily complex. At some point when multiple (other) clients (not shown in FIG. 5) are interconnected, it may become beneficial for operational reasons to change the internal topology of the network X. This reconfiguration may be to improve the service to some or all of the clients (by relocating internal elements in order to reduce delay etc.), or for internal efficiency or cost issues that do not impact directly on the clients, but which may benefit the network operator.

This reconfiguration is illustrated by FIGS. 5(c) and 5(d). The proxies P1 and P2 first create duplicates of the active streams which are traversing network X, thus creating a new, parallel set of feeds. These new feeds are transmitted over what is essentially a newly-configured network X', arriving at the far-end proxy together with the original feeds which traverse network X. The proxies P1 and P2 maintain the original stream (i.e. that via network X) to their respective clients, whilst also receiving the new streams (i.e. via network X'). At some appropriate time, the proxies P1 and P2 then replace the streams to the clients from X to X', such that the clients experience no (or minimal) disruption to the video and signalling streams. Once the new X' streams are established (and preferably stable), the streams running over network X may be safely disconnected.

In order to maintain a seamless visual experience at each client, care may need to be taken in the way the proxies replace the streams to the clients from network X with those from network X'. The two streams should be identical and synchronised so that there are no discontinuities in the video stream being presented to the client. For this reason, each proxy is preferably able to match packets being received from both streams. In the case of the RTP streaming protocol, the proxy would ensure that identical sequence numbers are applied to each packet when duplicating the streams which are sent via networks X and X'. As an additional measure, if the video coding scheme in use conforms to the MPEG-4 standard (for example the H.264 codec, which is in common use), then the receiving proxy can wait for an Intra Frame (I-Frame) to appear in the streams from network X and X'. It can then switch to packets from network X' ensuring that packets sent from this stream begin with that I-Frame.

The proxy module could determine packet sequence numbers and/or timestamps, and could identify I-Frames by inspecting the RTP and payload headers within each received packet. Depending on the application, a suitable algorithm could be used to ensure that the stream switch-over does not unduly affect the client. In the case of H.264 for example, the switching-induced loss of one or two packets that did not comprise part of an I-Frame would be unlikely to cause visible degradation, since the client decoder would be able to mask the loss. This would allow the proxy to be able to discard packets in order to re-synchronise streams. However in order to allow a clean switch-over, the proxy module could delay the switch-over until it has positively identified the next I-Frame.

It will be apparent that some level of overall monitoring and/or control is generally needed in this system, both to enable a decision to be taken that a change in network topology is required, and then to organise the relevant network components such that a seamless switch takes place. FIGS. 6 and 7 show an example of a simple system which incorporates such a control mechanism.

In FIG. 6, four clients C1-C4 (21-24) are distributed on either side of a transatlantic link 50, with C1 (21) and C2 (22) on one side and C3 (23) and C4 (24) on the other. All clients are isolated from the central network topology by their respective proxies P1-P4 (31-34). Consider the scenario in which C1, C2 and C3 are initially connected together, all using a central video router VR1 (41), which is located on the same side of the transatlantic link 50 as C1 and C2. Central control is provided by operation control component O (10), which has control connections to VR1 and to P1-P4.

It will be noted that the data streaming routes in use (i.e. enabling communication between C1, C2 and C3) are symbolised by thick continuous lines. Examples of these in FIG. 6 include the streaming route 60 between client C3 and its proxy P3, and the streaming route 61 between client proxy P3 and video router VR1. The control connections (i.e. between control component O and video routers VR1 and VR2, and between control component O and proxies P1-P4, are symbolised by thin dashed lines.

If new client C4 then joins the same session, control component O (10) might determine from C4's location (signalled to it via the control connection with proxy P4) that it would be more cost-efficient to start using a new video router VR2 (42) on the other side of the transatlantic link to avoid duplicating all the streams flowing to and from video router VR1 (41). This would mean that client C3's streams would need to be redirected to pass through video router VR2, so that the new topology around clients C3 and C4 would include new streaming routes 62 and 63 symbolised in FIG. 6 by the thick dotted lines.

FIGS. 7(a) and 7(b) are intended to clarify which data streaming routes would be in use before and after the switch from a topology using video router VR1 to a topology using new video router VR2. The components in FIGS. 7(a) and 7(b) are the same as those in FIG. 6, and could be numbered accordingly, but reference numerals have not been included thereon in order to keep the figures uncluttered.

In FIG. 7(a), the data streaming routes which would be in use before the switch are shown as thick continuous lines, and those yet to be established are not shown. In FIG. 7(b), the data streaming routes which would be in use after the switch are shown as thick continuous lines, and those that would be discontinued after the change are not shown.

A possible sequence of instructions from control component O to effect this change, which is illustrated in more detail by FIG. 8, might be as follows (assuming one incoming and one outgoing stream at each client):

1. C4 requests to join the session.
2. O starts up new video router VR2.
3. O requests P4 to start sending its outgoing stream from C4 to VR2.
4. O requests VR1 to send a duplicate of the outgoing streams from C1 and C2 to VR2.
5. O requests P3 to send a duplicate of its outgoing stream from C3 to VR2.
6. O requests VR2 to send the streams it is receiving from C3 and C4 to VR1.
7. O requests VR2 to send the streams it is receiving from VR1 to both P3 and P4.
8. O requests VR2 to send the stream it is receiving from P4 to P3, and the stream it is receiving from P3 to P4. The duplicate topology is now established.

9. O instructs P3 to switch the streams (originating from C1 and C2) which it is receiving from VR1 to the duplicate streams it is now receiving from VR2.
10. When the seamless switch has been successful, O instructs P3 to disconnect the streams it is receiving from VR1.

In the case that a streaming protocol such as RTP is used, then the combination of central control component O (10) and the distributed proxies P1-P4 (31-34) and video routers VR1 (41) and VR2 (42) may need to ensure that unique ports are used for the transfer of video streams and, if necessary, their associated signalling and configuration information (such as RTCP). One possible strategy would be for control component O to manage a central record of port allocation at each component. Another strategy might require each proxy or video router to maintain a local table of incoming and outgoing ports, which are each represented to control component O by an alphanumeric alias which is defined at creation time. Yet another strategy might require each component to support an appropriate session negotiation protocol in which ports are allocated in accordance with a specified algorithm.

In relation to preferred embodiments, it should be noted that the above illustrative switching sequence could be modified in practice to reduce the impact of seamless switching on the peak bandwidth demand across the transatlantic link. In the above example, a complete duplicate topology is created before any of the original links are disconnected. If multiple clients had to be switched, or multiple streams were being sent from each client to all the others, it might be more efficient to adopt a one-by-one approach, in which one duplicate stream is connected, the appropriate proxy is instructed to switch it, and the original stream is disconnected. This would be likely to result in an increase in signalling traffic, but could improve efficiency on the basis that this would occupy a fraction of the bandwidth of the video streams themselves.

It will be apparent from the discussion above that packets being transmitted across networks X and X' in FIG. 5 may experience different amounts of delay and thus arrive at the respective destination client proxies at different times. It is common practice for a client to store incoming packets in a buffer, and this approach can be used to compensate for small amounts of delay of this kind. However, this could result in different clients experiencing different amounts of delay, and in a situation according to preferred embodiments where network interconnections can be changed dynamically, there could be a greater detrimental impact on customer experience. In a further refinement, preferred embodiments could be implemented in such a way as to ensure that this level of delay remains consistent across all clients. It has already been explained that, in preferred embodiments, a central component O (10) maintains control connections with each of the video routers and proxies. The role of component O could be extended such that it also records measurements of delay between each of these entities. Mechanisms for measuring delay are well known in the art and include the use of the RTP Control Protocol (RTCP), which can gather delay statistics pertaining to a specific RTP stream. If we assume that control component O maintains a record of delay measurements for each network interconnection which could be practically used within a communication session (including all registered clients), then it is possible to calculate the maximum end-to-end delay between any combination of endpoints which could be expected to join such a session. In order to provide a consistent delay between all clients, the buffers receiving each incoming stream at each client could be configured to store sufficient packets such that each stream is always presented with the pre-calculated maximum end-to-end delay. This would mean that, whenever a video router configuration change was made, an additional signalling communication would be required between central component O and the or each client concerned to provide instructions about the correct buffer sizes to use. The advantage of this approach is that all clients should maintain a consistent experience, even in the presence of significant differences in delay between network routes. It is recognised that the delay over a particular interconnection may change over time and thus it may be appropriate for central component O to update its calculation of the maximum end-to-end delay on a periodic basis, and to adjust the buffer settings of each client accordingly.

The invention claimed is:

1. A method of managing streamed communication between a client device and one or more of a plurality of remote devices via a digital data communication network, the data communication network comprising a plurality of routers each operable to receive streamed data from one or more of said devices and/or from one or more other routers, and to forward said streamed data to one or more of said devices and/or to one or more other routers, the method comprising, at a proxy module associated with the client device:
   intercepting streamed data intended to be streamed between the client device and one or more of said remote devices via one of the routers of the digital data communication network, and streaming said data in one or more first router-side streams between the proxy module and a first one of said routers, and in one or more client-side streams between the proxy module and the client device;
   receiving an indication that data intended to be streamed between the client device and the one or more remote devices should be streamed via a different one of the routers, and in response thereto, establishing one or more second router-side streams between the proxy module and a second one of said routers;
   and after the establishment of the one or more second router-side streams:
   intercepting streamed data intended to be streamed between the client device and one or more of said remote devices via one of the routers, and streaming said data between the proxy module and the second router in the one or more second router-side streams while continuing to stream the data between the proxy module and the client device in the one or more client-side streams; and
   terminating the one or more first router-side streams.

2. A method according to claim 1 wherein the streamed data comprises streamed audio and/or video data.

3. A method according to claim 1 wherein the step of receiving an indication that data intended to be streamed between the client device and the one or more remote devices should be streamed via a different one of the routers comprises receiving an instruction from a predetermined control entity.

4. A method according to claim 1, the method including a switching operation performed after the establishment of the one or more second router-side streams and before the termination of the one or more first router-side streams, the switching operation comprising switching from a pre-switch mode in which the one or more first router-side streams are coupled with the one or more client-side streams whereby to provide streamed data between the client device and the one or more remote devices to a post-switch mode in which the one or more second router-side streams are coupled with the one or more client-side streams whereby to provide streamed data between the client device and the one or more remote devices.

5. A method according to claim 4 wherein the switching operation is performed at a time dependent on the content of the data being streamed in the first and/or second router-side streams.

6. A proxy module for managing streamed communication between a client device and one or more of a plurality of remote devices via a digital data communication network, the data communication network comprising a plurality of routers each operable to receive streamed data from one or more of said devices and/or from one or more other routers, and to forward said streamed data to one or more of said devices and/or to one or more other routers, the proxy module being associated with the client device and being operable to perform a method according to claim 1.

7. A system for managing streamed communication between a plurality of client devices via a digital data communication network, the data communication network comprising a plurality of routers each operable to receive streamed data from one or more of said client devices and/or from one or more other routers, and to forward said streamed data to one or more other client devices and/or to one or more other routers, the system comprising:
- a plurality of proxy modules, each proxy module being associated with one or more of said client devices and being operable to perform a method according to claim 1; and
- a control module operable to determine whether data intended to be streamed between one client device and another client device should be streamed via a different one of the routers, and if so, to issue a routing-change indication in respect of such a determination.

8. A system according to claim 7 wherein the control module is operable to monitor the client devices and/or their respective proxy modules and to determine from said monitoring whether data intended to be streamed between one client device and another client device should be streamed via a different one of the routers, and if so, to issue a routing-change indication in respect of such a determination.

9. A system according to claim 7 wherein the control module is operable to issue routing-change indications whereby to schedule routing changes in respect of data streams from different client devices to be effected at different times.

10. A system according to claim 7, wherein the control module is operable to monitor delays experienced by data streamed to and from respective client devices, to identify discrepancies between the respective delays, and to provide information to the client devices and/or to their respective proxy modules enabling action to be taken to decrease or remove said discrepancies.

11. A system according to claim 10 wherein the information provided to the client devices and/or to their respective proxy modules enables changes to buffer configurations of said client devices and/or of their respective proxy modules to be made whereby to decrease or remove said discrepancies.

12. A system according to claim 7, the system further comprising one or more multi-stream routers, each multi-stream router being operable to receive one or more streams of data and to receive in respect of each received stream an associated multi-stream indication, said multi-stream indications each indicating one or more entities towards which duplicates of the associated stream should be forwarded, each multi-stream router being operable to route a duplicate of the associated stream towards each of the entities indicated by said multi-stream indication.

13. A system according to claim 12 wherein said multi-stream indications indicate one or more client devices and/or one or more other routers towards which duplicates of an associated stream should be forwarded.

14. A system according to claim 12 wherein the control module is operable to provide said multi-stream indications to said one or more multi-stream routers.

* * * * *